United States Patent
Grover et al.

(10) Patent No.: US 12,381,885 B2
(45) Date of Patent: Aug. 5, 2025

(54) TIME-ONLY BASED AUTHENTICATION FACTORS

(71) Applicant: MICRO FOCUS LLC, Santa Clara, CA (US)

(72) Inventors: Douglas Max Grover, Rigby, ID (US); Michael F. Angelo, Houston, TX (US)

(73) Assignee: Micro Focus LLC, Santa Clara, CA (US)

( * ) Notice: Subject to any disclaimer, the term of this patent is extended or adjusted under 35 U.S.C. 154(b) by 141 days.

(21) Appl. No.: 17/943,811

(22) Filed: Sep. 13, 2022

(65) Prior Publication Data
US 2024/0089265 A1 Mar. 14, 2024

(51) Int. Cl.
*H04L 29/06* (2006.01)
*H04L 9/40* (2022.01)

(52) U.S. Cl.
CPC ........ *H04L 63/108* (2013.01); *H04L 63/0853* (2013.01); *H04L 63/105* (2013.01); *H04L 63/107* (2013.01); *H04L 63/20* (2013.01); *H04L 2463/082* (2013.01)

(58) Field of Classification Search
CPC . H04L 63/108; H04L 63/0853; H04L 63/105; H04L 63/107; H04L 63/20; H04L 2463/082; H04L 9/32; H04L 47/76; H04L 47/822; H04L 2012/5631; H04L 63/0869; H04L 63/0884; G06F 21/30; G06F 21/31; G06F 21/44; G06F 2211/003; G06F 2209/503; G06F 16/487; G06F 16/587; G06F 16/687; G06F 16/787; G06F 16/909; G06Q 20/3674; G06Q 20/409; G06Q 20/4097; G06Q 10/0631; G06Q 10/06315; H04N 21/25875; H04N 21/2396; H04N 2201/3233; H04N 2201/3239; H04W 12/06; H04W 72/535; G11B 20/00862; G05B 2219/32365; H04Q 2213/13526; H04M 2203/6072; G01N 2015/1447; G03G 21/1892
See application file for complete search history.

(56) References Cited

U.S. PATENT DOCUMENTS

| | | | |
|---|---|---|---|
| 10,356,105 B2 | 7/2019 | Wang | |
| 10,776,479 B2 | 9/2020 | Chatterton | |
| 2018/0097787 A1* | 4/2018 | Murthy | .................. H04L 63/08 |
| 2019/0132303 A1* | 5/2019 | Kurian | .................... H04L 63/08 |

* cited by examiner

*Primary Examiner* — Joseph P Hirl
*Assistant Examiner* — Leynna Truvan
(74) *Attorney, Agent, or Firm* — Sheridan Ross P.C.

(57) ABSTRACT

A multi-factor authentication request of a user is received. For example, the multi-factor authentication request may include a valid username/password and a valid fingerprint scan. A first authentication factor of the multi-factor authentication request is an access authentication factor (e.g., the valid username/password) and a second authentication factor (e.g., the valid fingerprint scan) of the multi-factor authentication request is one of: a time-only authentication factor; a multi-session authentication factor; and a location-only authentication factor. The user is authenticated based on the first authentication factor and the second authentication factor. Access is granted to one or more resources according to one or more rules associated with the first authentication factor and second authentication factor.

20 Claims, 10 Drawing Sheets

| Authentication Factor(s) | Resource | Access Time Period |
|---|---|---|
| Username/Password (L1) | Resource 103XA | 8:00 AM to 5:00 PM Monday to Friday |
| Username/Password (L1) SMS (T1) | Resource 103XB | Anytime |
| Username/Password Voiceprint (L2) | Resource 103XA | 8:00 AM to 5:00 PM Monday to Friday |
| Username/Password Voiceprint (L2) SMS (T1) | Resource 103XB | Anytime |

FIG. 3

| Time Based Access | | |
|---|---|---|
| Authentication Factor(s) | Resource | Access Time Period |
| Username/Password | Resource 103X | 8:00 AM to 5:00 PM Monday to Friday |
| | Resource 103Y | None |
| Username/Password and SMS | Resource 103X | Anytime |
| | Resource 103Y | 6:00 AM to 10:00 PM Monday to Friday |
| Username/Password and Fingerprint Scan | Resource 103X | Anytime |
| | Resource 103Y | Anytime |
| | Resource 103Z | Anytime Monday to Friday |
| Username/Password, SMS, and Fingerprint Scan | Resources 103 X, Y, and Z | Anytime |

FIG. 5

| Access Based Authentication Factors 600 | | |
|---|---|---|
| Authentication Factor(s) 601 | Resource 602 | Session 603 |
| Username/Password | Resource 103X | Single Session |
| Username/Password and SMS | Resource 103X | Two Sessions |
| Username/Password and Fingerprint Scan | Resource 103X | Three Sessions |

FIG. 6

| Time/Session Based Access 700 | | | |
|---|---|---|---|
| Authentication Factor(s) 701 | Resource 702 | Session 703 | Access Time Period 704 |
| Username/Password | Resource 103X | Single Session | 8:00 AM to 5:00 PM Monday to Friday |
| Username/Password and SMS | Resource 103X | Single Session | Anytime |
| Username/Password and Iris Scan | Resource 103X | Two Sessions | 6:00 AM to 10:00 PM Monday to Friday |
| Username/Password, Iris Scan, SMS | Resource 103X | Two Sessions | Anytime |

FIG. 7

| Authentication Factor(s) | Location/Time Based Access — 800 | | |
|---|---|---|---|
| 801 | Resource 802 | Access 803 | Access Time Period 804 |
| Username/Password | Resource 103X | Internal Access | 8:00 AM to 5:00 PM Monday to Friday |
| Username/Password and SMS | Resource 103X | Internal Access | Anytime |
| Username/Password and Voiceprint | Resource 103X | Internal/External Access | 8:00 AM to 5:00 PM Monday to Friday |
| Username/Password, SMS and Voiceprint | Resource 103X | Internal/External Access | Anytime |

FIG. 8

TIME-ONLY BASED AUTHENTICATION FACTORS

FIELD

The disclosure relates generally to network security and particularly to network security based on time-only authentication factors.

BACKGROUND

Network security is a problem that is constantly changing. Being able to control how and when data is accessed is also an ongoing problem. In most instances, administration of access time and authentication factors are separate. This can sometimes lead to reduced security if the two systems are not coordinated.

SUMMARY

These and other needs are addressed by the various embodiments and configurations of the present disclosure. The present disclosure can provide a number of advantages depending on the particular configuration. These and other advantages will be apparent from the disclosure contained herein.

A multi-factor authentication request of a user is received. For example, the multi-factor authentication request may include a valid username/password and a valid fingerprint scan. A first authentication factor of the multi-factor authentication request is an access authentication factor (e.g., the valid username/password) and a second authentication factor (e.g., the valid fingerprint scan) of the multi-factor authentication request is one of: a time-only authentication factor; a multi-session authentication factor; and a location-only authentication factor. The user is authenticated based on the first authentication factor and the second authentication factor. Access is granted to one or more resources according to one or more rules associated with the first authentication factor and second authentication factor.

The phrases "at least one", "one or more", "or," and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein.

It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine," "calculate" and "compute," and variations thereof, as used herein, are used interchangeably, and include any type of methodology, process, mathematical operation, or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

BRIEF DESCRIPTION OF THE DRAWINGS

FIG. 3 is a diagram of an exemplary access table that uses time-only authentication factors with multi-level authentication.

FIG. 5 is a diagram of an exemplary access table that uses time-only authentication factors with multi-level authentication for multiple resources.

FIG. 6 is a diagram of an exemplary access table that uses multi-session authentication factors.

FIG. 7 is a diagram of an exemplary access table that uses time-only authentication factors and multi-session authentication factors.

FIG. 8 is a diagram of an exemplary access table that uses location-only authentication factors.

In the appended figures, similar components and/or features may have the same reference label. Further, various components of the same type may be distinguished by following the reference label by a letter that distinguishes among the similar components.

If only the first reference label is used in the specification, the description is applicable to any one of the similar components having the same first reference label irrespective of the second reference label.

DETAILED DESCRIPTION

Figure 1:
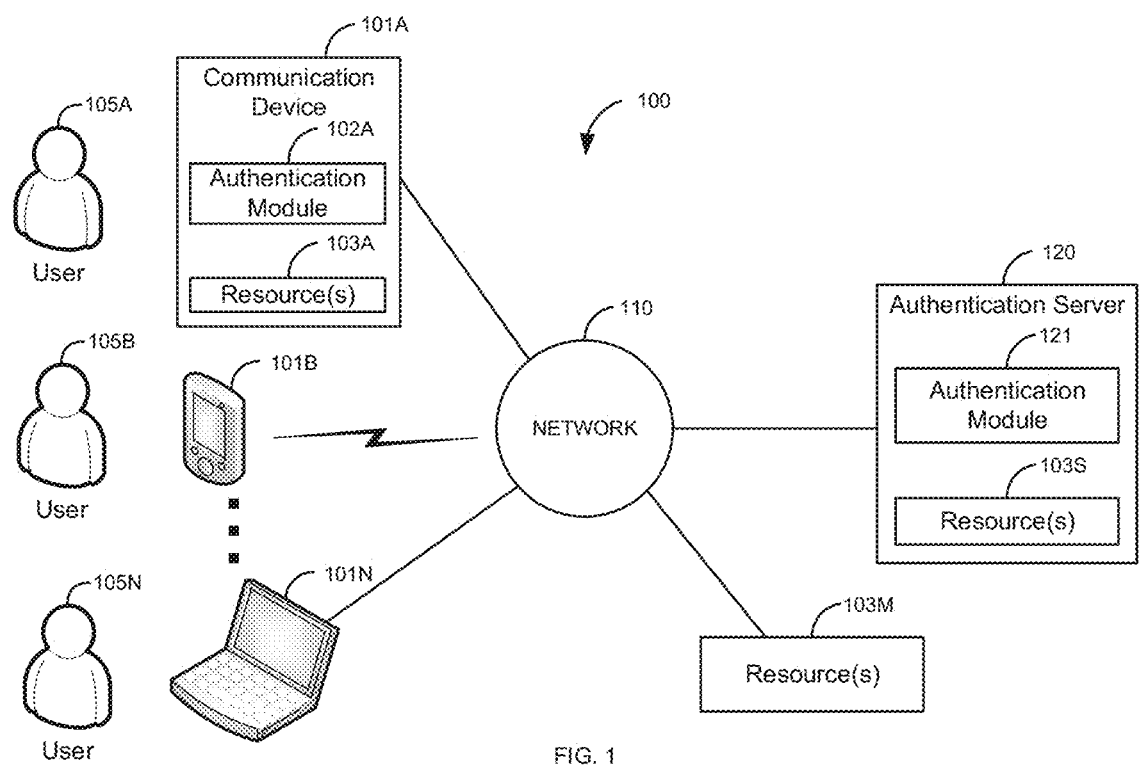
FIG. 1 is a block diagram of a first illustrative system for using time-only/multi-session/location-only authentication factors.

FIG. 1 is a block diagram of a first illustrative system 100 for using time-only/multi-session/location-only authentication factors. The first illustrative system 100 comprises communication devices 101A-101N, a network 100, an authentication server 120, and resource(s) 103M.

The communication devices 101A-101N can be or may include any user device that can communicate on the network 110, such as a Personal Computer (PC), a telephone, a video system, a cellular telephone, a Personal Digital Assistant (PDA), a tablet device, a notebook device, a smartphone, a server, and/or the like. As shown in FIG. 1, any number of communication devices 101A-101N may be connected to the network 110, including only a single communication device 101. In addition, users 105A-105N are shown for convenience.

The communication device 101A further comprises an authentication module 102A and resource(s) 103A. Although not shown for convenience, the communication devices 101B-101N may also have corresponding authentication modules 102B-102N and resource(s) 103B-103N.

The authentication module 102A can be or may include any hardware coupled with software that can authenticate a user 105. The authentication module 102A is used to grant access to one or more of the resources 103A-103N, 103M, and 103S (collectively referred to as resources 103). The authentication module 102A may authenticate the user 105A in various ways, such as, via a username/password, via a biometric (e.g., a fingerprint scan, a voiceprint, an iris scan, etc.), via questions, via a Short Message Service (SMS) code, via a chat code, via an email code, and/or the like. The authentication module 102A may comprise one or more biometric devices, such as, a fingerprint scanner, an iris scanner, a microphone, and/or the like. In one embodiment, the authentication module 102A is self-contained and can control access to one or more of the resources 103 without using the authentication server 120/authentication module 121. Alternatively, the authentication module 102A may work in conjunction with the authentication server 120/authentication module 121 to grant access to one or more of the resources 103.

The resource(s) 103A can be any resource 103 that can be accessed by the user 105A, such as, an application, a database, a network 110, a server, a file, an operating system, a virtual machine, a container, a device, an embedded device, a drive, a cloud service, and/or the like. The resource(s) 103A are local to the communication device 101A.

The authentication server 120 can be, or may include, any hardware coupled with software that can provide access/security for any of the resources 103. The authentication server 120 further comprises an authentication module 121 and resource(s) 103S. The authentication module 121 works in conjunction with the authentication modules 102A-102N to authenticate the users 105A-105N. The resource(s) 103S can be the same or different from the resource(s) 123A-103N/103M. The resource(s) 103S are local to the authentication server 120.

The network 110 can be or may include any collection of communication equipment that can send and receive electronic communications, such as the Internet, a Wide Area Network (WAN), a Local Area Network (LAN), a packet switched network, a circuit switched network, a cellular network, a combination of these, and the like. The network 110 can use a variety of electronic protocols, such as Ethernet, Internet Protocol (IP), Hyper Text Transfer Protocol (HTTP), Web Real-Time Protocol (Web RTC), and/or the like. Thus, the network 110 is an electronic communication network configured to carry messages via packets and/or circuit switched communications.

The authentication module 121 may be any hardware coupled with software that can provide accesses to any of the resources 103. The authentication module 121 may work in conjunction with the authentication module 102A.

The resource(s) 103M may be similar and/or different to the resource(s) 103A.

The resource(s) 103M may be similar and/or different from the resource(s) 103A-103N/103S. The resource(s) 103M are on the network 110. For example, the resources 103M may be data stored on a file server.

Figure 2:
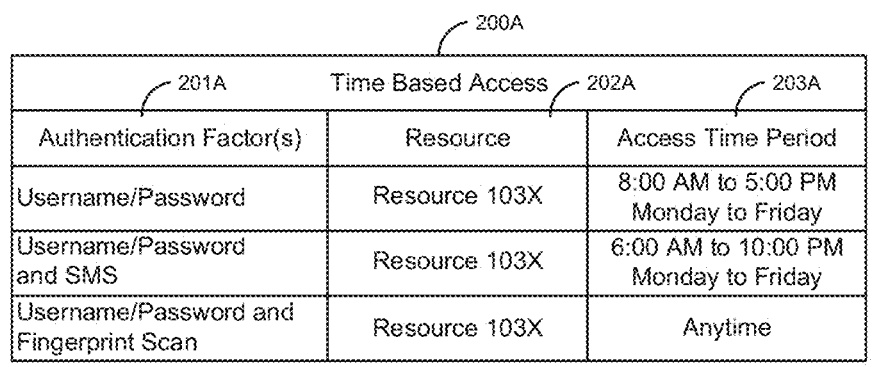
FIG. 2 is a diagram of an exemplary access table that uses time-only authentication factors.

FIG. 2 is a diagram of an exemplary access table 200A that uses time-only authentication factors. The access table 200A comprises an authentication factor column 201A, a resource column 202A, and an access time period column 203A. The authentication factor column 201A identifies what specific authentication factors are required to access the resource(s) 103. The resource column 202A identifies what resource(s) 103 is involved and the access time period column 203A identifies the access associated with the authentication factors.

Take a basic authentication process where a user 105 normally authenticates to a resource 103 (e.g., an application) with a username/password. The regular authentication process is extended using one or more time-only authentication factors. In FIG. 2, there are two time-only authentication factors: 1) a SMS code and 2) a fingerprint scan. The time-only authentication factors are only associated with time and not related to any other access privileges. Just providing a valid username/password allows the user 105 to access the resource 103X between 8:00 AM and 5:00 PM Monday to Friday (regular working hours). If the user 105 needs access to the resource 103X between 6:00 AM and 10:00 PM on Monday to Friday, the user 105 has to provide a valid SMS code.

If the user 105 wants access to the resource 103X at any other time, the user 105 has to provide a valid fingerprint scan.

If the user 105 has authenticated with a username/password and the time changes to from 5:00 PM to 5:01 PM, the user 105 will be asked to provide the valid SMS code or the valid fingerprint scan to continue to access resource 103X. The user 105 may have an option to provide one or the other. In addition, there may be rules associated with time-only authentication factors. For example, the user 105A may not be allowed to use any time-only authentication factors, the user 105B may only be able to use a SMS code (only be allowed access from 8:00 AM to 10:00 PM Monday to Friday), and user 105C may be able to use both the SMS/fingerprint scan time-only authentication factors.

Although not shown in FIG. 2, the user 105 may have to always provide at least one time-only authentication factor. For example, there may be three time-only authentication factors, one for each of the three access time periods (8:00 AM to 5:00 PM Monday to Friday, 6:00 AM to 10:00 PM Monday to Friday, and anytime).

In addition, access may be based on multiple time-only authentication factors. For example, for anytime access to resource 103X, the user 105 may have to provide both a valid SMS code and a valid fingerprint scan. In other words, there may be multilevel time-only authentication factors required to get enhanced time-only access.

The process can use a hard time period. For example, providing a username/password will allow the user 105 access for one hour, providing a username/password/SMS will provide the user 105 eight hours of access, and providing a username/password/fingerprint scan will all the user 105 access until the user 105 logs out.

FIG. 3 is a diagram of an exemplary access table 200B that uses time-only authentication factors with multi-level authentication. The access table 200B comprises an authentication factor column 201B, a resource column 202B, and an access time period column 203B. The authentication factor column 201B identifies what specific authentication factors are required to access the resource(s) 103. The resource column 202B identifies what resource(s) 103 is involved and the access time period column 203B identifies the access time associated with the authentication factors.

In FIG. 3, there are two authentication levels to initially access the resource 103X:1) level one that requires a username/password and 2) level two that requires a username/password and a voiceprint. Resource 103X has different access requirements for different resources 103 as designated by 103XA and 103XB. For example, the resource 103X may be a customer database for bank X. The resource 103XA may be the customer's name/address and the resource 103XB may be the customer's account/credit card information.

In this example there is one, time-only authentication factor (SMS code). The user 105 is provided full time access by submitting a valid SMS code at either of the two authentication levels. As another example, the user 105 can authenticate at level one and get read only access to a database (a resource 103). When the user 105 provides a valid SMS code the user 105 will have anytime access to the database. The same user 105 can authenticate at level two and get read/write access to the database. By providing the valid SMS code, the user 105 gets anytime access to the database.

Figure 4:
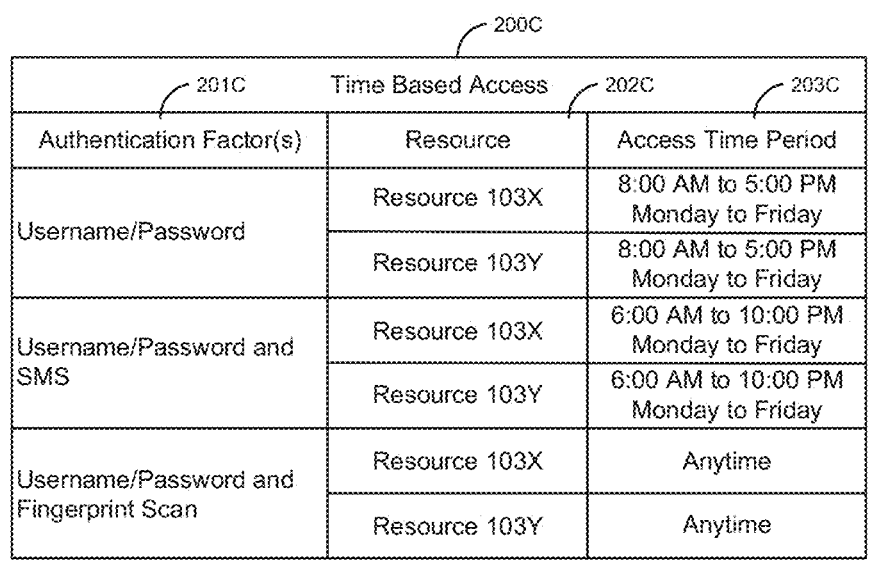
FIG. 4 is a diagram of an exemplary access table that uses time-only authentication factors for multiple resources.

FIG. 4 is a diagram of an exemplary access table 200C that uses time-only authentication factors for multiple resources 103. The access table 200C comprises an authentication factor column 201C, a resource column 202C, and an access time period column 203C. The authentication factor column 201C identifies what specific authentication factors are required to access the resource(s) 103. The resource column 202C identifies what resource(s) 103 are involved and the access time period column 203C identifies the time access associated with the authentication factors.

The use of time-only authentication factors can be extended to a single sign-on process as shown in FIG. 4. In FIG. 4, like FIG. 2, there are two time-only authentication factors: 1) a SMS code and 2) a fingerprint scan. Just using the username/password allows the user 105 to access resources 103X/103Y between 8:00 AM and 5:00 PM Monday to Friday. If the user 105 needs access to resources 103X/103Y between 6:00 AM and 10:00 PM on Monday to Friday, the user 105 will have to provide a valid SMS code. If the user 105 wants access to resources 103X/103Y at any other time, the user 105 must provide a valid fingerprint scan in addition to the valid username/password.

FIG. 5 is a diagram of an exemplary access table 200D that uses time-only authentication factors with multi-level authentication for multiple resource 103. The access table 200D comprises an authentication factor column 201D, a resource column 202D, and an access time period column 203D. The authentication factor column 201D identifies what specific authentication factors are required to access the resource(s) 103. The resource column 202D identifies what resource(s) 103 are involved and the access time period column 203D identifies the time access associated with the authentication factors.

The processes described in FIGS. 2-4 can be combined to provide varying levels of time-only access using single sign-on multifactor authentication as shown in FIG. 5. With a valid username/password, the user 105 gets access to the resource 103X from 8:00 AM to 5:00 PM Monday through Friday; however, the user 105 cannot access the resource 103Y. If the user 105 authenticates with a username/password and the SMS time-only authentication factor, the user 105 now has access to resource 103X at any time and resource 103X from 6:00 AM to 10:00 PM Monday through Friday. In other words, the SMS time-only authentication factor has different time-based access depending on the resource 103X/103Y.

If the user 105 provides a valid username/password and a valid fingerprint scan, the user 105 has access to the resources 103X/103Y at any time and now has access to the resource 103Z anytime Monday through Friday. Note that the time-only authentication factors SMS/fingerprint scan provides the same access (anytime) for resource 103X. In other words, either time-only authentication factor will provide anytime access to the resource 103X. If the user 105 provides the valid username/password, the valid SMS code, and the valid fingerprint scan, the user 105 now has access to the resources 103X, 103Y, and 103Z at any time. In this case, the time-only authentication factors SMS/fingerprint scan both apply to the resource 103Z where for resources 103X and 103Y, either one provides anytime access.

FIG. 6 is a diagram of an exemplary access table 600 that uses multi-session authentication factors. The access table 600 comprises an authentication factor column 601, a resource column 602, and a session column 603. The authentication factors column 601 identifies what specific authentication factors are required to access the resource(s) 103. The resource column 602 identifies what resource(s) 103 are involved and the session column 603 identifies the number of sessions associated with authentication factors.

Instead of the authentication factors being time-only, the authentication factors in FIG. 6 are multi-session authentication factors. A session may be where the user 105 accesses a web site. Once the user 105 leaves and comes back, the access would be considered a new session (e.g., similar how cookies are used). In FIG. 6, the username/password is a single session authentication factor. The authentication factors for SMS, and fingerprint scan are multi-session authentication factors. If the user 105 provides a valid username/password and a valid SMS code, the user 105 can access the resource 103X for two sessions without having to authenticate again. If the user 105 provides a valid username/password and a valid fingerprint scan, the user 105 can access the resource 103X for three sessions without having to authenticate again.

FIG. 7 is a diagram of an exemplary access table 700 that uses time-only authentication factors and multi-session authentication factors. The access table 700 comprises an authentication factor column 701, a resource column 702, a session column 703 and an access time period column 704. The authentication factor column 701 identifies what specific authentication factors are required to access the resource(s) 103. The resource column 702 identifies what resource(s) 103 are involved. The session column 703 identifies the number of sessions associated with the authentication factors and the access time period column 704 identifies the time access associated with the authentication factors.

The use of multi-session tokens is combined with the time-only authentication factors as shown in FIG. 7. In FIG. 7, there is one multi-session authentication factor (an iris scan) and one, time-only authentication factor (a SMS code). When the user 105 provides a valid username/password the user 105 is granted access for a single session from 8:00 AM to 5:00 PM Monday to Friday to the resource 103X. When the user 105 provides a valid username/password and a valid SMS code (the time-only authentication factor), the user 105 is granted access to the resource 103X at any time. If the user 105 provides a valid username/password and a valid iris scan (the session-only based authentication factor), the user 105 is granted access to the resource 103X from 6:00 AM to 10:00 PM Monday to Friday for two sessions. If the user 105 provides a valid username/password, a valid SMS code, and a valid iris scan, the user 105 is given access to the resource 103X for two sessions at any time.

FIG. 8 is a diagram of an exemplary access table 800 that uses location-only authentication factors. The access table 800 comprises an authentication factor column 801, a resource column 802, an access column 803, and an access time period column 804. The authentication factor column 801 identifies what specific authentication factors are required to access the resource(s) 103. The resource column 802 identifies what resource(s) 103 are involved. The access column 803 identifies whether the access is internal and/or external and the access time period column 804 identifies the access associated with the authentication factors.

In FIG. 8, there is a time-only authentication factor (SMS) and a location-only authentication factor (voiceprint). The time-only authentication factor works like the previously described time-only authentication factors. By providing the location-only authentication factor (voiceprint), the user 105 is granted external access (e.g., access form the Internet to the network 110). The time-only authentication factor (username/password) provides anytime access.

The location-only authentication factors may be GEO location factors. For example, a GEO location of the user's home address or a branch location of the company may be tied to the any voiceprint authentication factor. The location-only authentication factors may be used with the session/time-only authentication factors as well.

Figure 9:
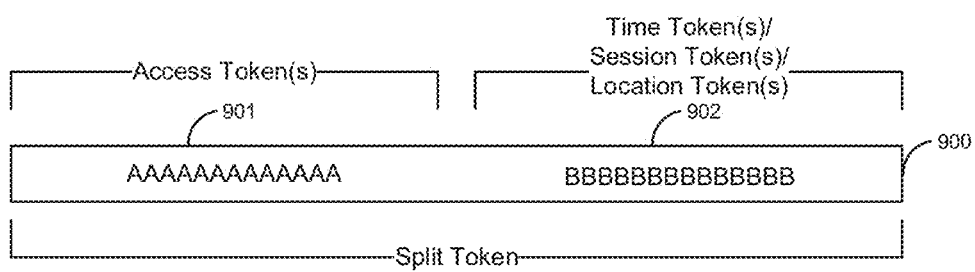
FIG. 9 is a diagram for using split tokens.

FIG. 9 is a diagram for using split tokens 900. The split token 900 comprises access token(s) 901 and time-only/multi-session/location token(s). The access token(s) may be generated based on the user 105 providing the username/password of FIG. 2. The time token(s)/session token(s)/location token(s) 902 are generated based on the time-only/multi-session/location-only authentication factors. For example, there may be an authentication token(s) 901 associated with the authentication level(s), time token(s) 902 associated with the time-only authentication factor(s), session-based token(s) 902 associated with the session-only based authentication factor(s) and location-based token(s) 902 associated with the location-only authentication factors. If there are two authentication factors associated with the authentication level and two time-only authentication factors, there could two tokens 901 associated with the two authentication levels and two tokens 902 associated with the two time-only authentication factors.

Figure 10:
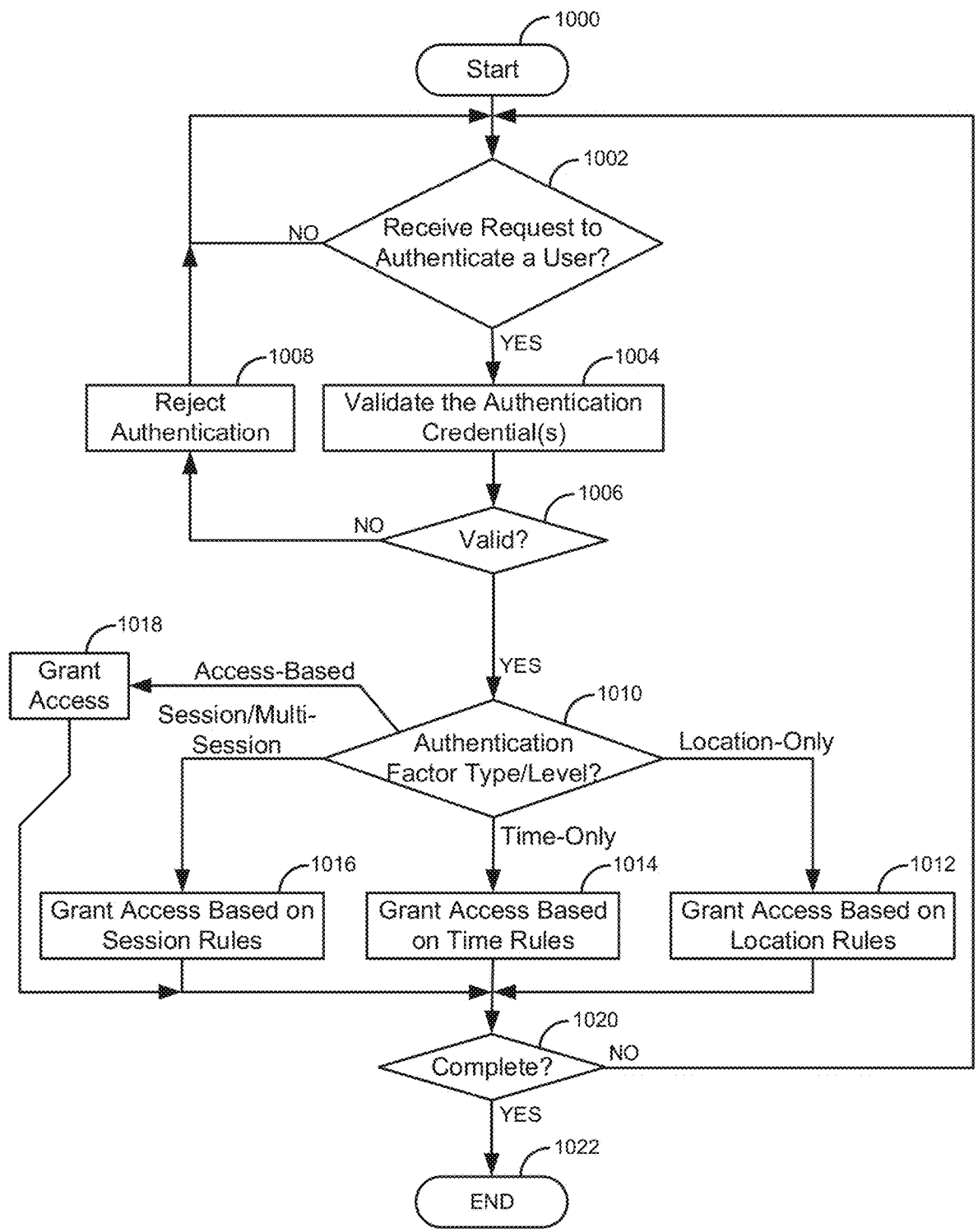
FIG. 10 is a flow diagram of a process for using time-only/multi-session/location-only authentication factors.

FIG. 10 is a flow diagram of a process for using time-only/multi-session/location-only authentication factors. Illustratively, the communication devices 101A-101N, the authentication modules 102A-102N/121, the resources 103A-103N/103M/103S, and the authentication server 120 are stored-program-controlled entities, such as a computer or microprocessor, which performs the method of FIG. 10 and the processes described herein by executing program instructions stored in a computer readable storage medium, such as a memory (i.e., a computer memory, a hard disk, and/or the like). Although the method described in FIG. 10 is shown in a specific order, one of skill in the art would recognize that the steps in FIG. 10 may be implemented in different orders and/or be implemented in a multi-threaded environment. Moreover, various steps may be omitted or added based on implementation.

The process starts, in step 1000. The authentication module 102 receives a request from the user 105 to authenticate in step 1002. The request of step 1002 may be where the user 105 provides a username/password and a SMS code. If a request to authenticate is not received in step 1002, the process of step 1002 repeats.

Otherwise, if a request to authenticate is received in step 1002, the authentication module 102 and/or 121, validates the provided authentication credential(s) in step 1004. If the authentication credential(s) are not valid in step 1006, the authentication module 102 and/or 121 reject the authentication request in step 1008 and the process goes back to step 1002.

If the authentication credential(s) are valid in step 1006, the authentication module 102 and/or 121 determines, in step 1010, the specific authentication factors that were provided by the user 105. As discussed herein, there are five types of authentication factors: 1) access-based, 2) time-only, 3) single-session, 4) multi-session, and 5) location-only authentication factors. The branches of step 1010 may occur in parallel and/or in serial if there are different types of authentication factors.

If there is an access-based authentication factor(s), access is granted in step 1018 according to the rules associated with the access authentication factor by authentication modules 102 and/or 121. The process then goes to step 1020. If there are location-only authentication factor(s) in step 1010, the authentication modules 102 and/or 121 grants access based on the location-only authentication factor(s) in step 1012 and the process goes to step 1020. If there are time-only authentication factor(s) in step 1010, the authentication modules 102 and/or 121 grants access based on the time-only authentication factor(s) in step 1014 and the process goes to step 1020. If there are session/multi-session authentication factors in step 1010, the authentication modules 102 and/or 121 grants access according to the session/multi-session authentication factors in step 1016 and the process goes to step 1020.

The authentication modules 102 and/or 121 determines, in step 1020, if the process is complete. If the process is not complete in step 1020, the process goes back to step 1002. Otherwise, if the process is complete in step 1020, the process ends in step 1022.

Examples of the processors as described herein may include, but are not limited to, at least one of Qualcomm® Snapdragon® 800 and 801, Qualcomm® Snapdragon®610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Any of the steps, functions, and operations discussed herein can be performed continuously and automatically.

However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like.

In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. A system comprising:
a microprocessor; and
a computer readable medium, coupled with the microprocessor and comprising microprocessor readable and executable instructions that, when executed by the microprocessor, cause the microprocessor to:
receive a multi-factor authentication request of a user to access a selected resource, wherein a first authentication factor of the multi-factor authentication request is an access authentication factor and wherein a second authentication factor of the multi-factor authentication request is one of:
a time-only authentication factor, wherein a timestamp associated with receiving the multi-factor authentication request to access the selected resource determines which authentication factor of a plurality of possible authentication factors are used as the time-only authentication factor, wherein the plurality of possible authentication factors comprise a valid SMS code, a valid fingerprint scan, a valid voiceprint, and a valid iris scan, wherein the time-only authentication factor at a first timestamp associated with recieving the multi-factor to authentication request to access selected resource is a first one of the plurality of possible authentication factors, wherein the time-only authentication factor at a second timestamp associated with receiving the multi-factor authentication request to access the selected resource is a second one of the plurality of possible authentication factors, the first and second ones of the plurality of possible authentication factors being different; and
a spatial location-only authentication factor, wherein a spatial location associated with the user when the multi-factor authentication request to access the selected resource is received determines which authentication factor of the plurality of possible authentication factors are used as the spatial location-only authentication factor, wherein the spatial location-only authentication factor at a first spatial location associated with the user is the first one of plurality of possible authentication factors, wherein the spatial location-only authentication factor at a second spatial location associated with the user is the second one of the plurality of possible authentication factors;
authenticate the user based on the first authentication factor and the second authentication factor; and
grant access to one or more resources according to one or more rules associated with the first authentication factor and second authentication factor.

2. The system of claim 1, wherein the plurality of possible authentication factors comprises a least two of:
the time-only authentication factor;
a multi-session authentication factor that enables the user to access a set of resources in multiple discrete sessions without a further successful authentication; and
the spatial location-only authentication factor.

3. The system of claim 1, wherein the second authentication factor is the time-only authentication factor.

4. The system of claim 3, wherein the second authentication factor is one of a plurality of time-only authentication factors that are used as part of the multi-factor authentication request and wherein the plurality of time-only authentication factors allows the user to have different time-only access.

5. The system of claim 3, wherein the multi-factor authentication request is for a first authentication level of a plurality of authentication levels and wherein the second authentication factor grants different permissions based on which one of the plurality of authentication levels is being requested.

6. The system of claim 3, wherein the second authentication factor is one of a plurality of time-only authentication factors and wherein the plurality of time-only authentication factors provide different time-only access to a plurality of different resources.

7. The system of claim 3, wherein the second authentication factor comprises a plurality of time-only authentication factors and wherein the plurality of time-only authentication factors provide different levels of access to a plurality of different resources and wherein the plurality of possible authentication factors comprise a valid SMS code, a valid fingerprint scan, a valid voiceprint, and a valid iris scan.

8. The system of claim 3, wherein the time-only authentication factor provides different access to different resources.

9. The system of claim 1, wherein the second authentication factor further comprises a multi-session authentication factor.

10. The system of claim 9, wherein the second authentication factor comprises a plurality of authentication factors that each allow the user to access a different number of sessions.

11. The system of claim 1, wherein the first authentication factor generates a first token and the second authentication factor generates a second token and wherein the first token and the second token comprise a split token.

12. The system of claim 1, wherein the second authentication factor is the spatial location-only authentication factor and wherein the spatial location-only authentication factor is based on a GEO location associated with the user.

13. A method comprising:
receiving, by a microprocessor, a multi-factor authentication request of a user to access a selected resource, wherein a first authentication factor of the multi-factor authentication request is an access authentication factor and wherein a second authentication factor of the multi-factor authentication request is one of:
a time-only authentication factor, wherein a timestamp associated with receiving the multi-factor authentication request to access the selected resource determines which authentication factor of a plurality of possible authentication factors are used as the time-only authentication factor, wherein the plurality of possible authentication factors comprise a valid SMS code, a valid fingerprint scan, a valid voiceprint, and a valid iris scan, wherein the time-only authentication factor at a first timestamp associated with receiving the multi-factor authentication request to access the selected resource is a first one of the plurality of possible authentication factors, wherein the time-only authentication factor at a second timestamp associated with receiving the multi-factor authentication request to access the selected resource is a second one of the plurality of possible authentication factors, the first and second ones of the plurality of possible authentication factors being different; and
a spatial location-only authentication factor, wherein a spatial location associated with the user when the multi-factor authentication request is received determines which authentication factor of the plurality of possible authentication factors are used as the spatial location-only authentication factor, wherein the spatial location-only authentication factor at a first spatial location associated with the user is the first one of the plurality of possible authentication factors, wherein the spatial location-only authentication factor at a second spatial location associated with the user is the second one of the plurality of possible authentication factors;
authenticating, by the microprocessor, the user based on the first authentication factor and the second authentication factor; and
granting access, by the microprocessor, to one or more resources according to one or more rules associated with the first authentication factor and second authentication factor.

14. The method of claim 13, wherein the second authentication factor comprises a plurality of authentication factors and wherein the plurality of authentication factors comprises at least two of:
the time-only authentication factor;
a multi-session authentication factor that enables the user to access a set of resources in multiple discrete sessions without a further successful authentication; and
the spatial location-only authentication factor.

15. The method of claim 13, wherein the second authentication factor is the time-only authentication factor.

16. The method of claim 15, wherein the second authentication factor is one of a plurality of time-only authentication factors that are used as part of the multi-factor authentication request and wherein the plurality of time-only authentication factors allows the user to have different time-only access.

17. The method of claim 15, wherein the time-only authentication factor provides different access to different resources.

18. The method of claim 13, wherein the second authentication factor further comprises a multi-session authentication factor.

19. The method of claim 13, wherein the second authentication factor is the spatial location-only authentication factor and wherein the spatial location-only authentication factor is based on a GEO location associated with the user.

20. A non-transient computer readable medium having stored thereon instructions that cause a processor to execute a method, the method comprising instructions to:
receive a multi-factor authentication request of a user to access a selected resource, wherein a first authentication factor of the multi-factor authentication request is an access authentication factor and wherein a second authentication factor of the multi-factor authentication request is one of:
a time-only authentication factor, wherein a timestamp associated with receiving the multi-factor authentication request to access the selected resource determines which authentication factor of a plurality of possible authentication factors are used as the time-only authentication factor, wherein the plurality of possible authentication factors comprise a valid SMS code, a valid fingerprint scan, a valid voiceprint, and a valid iris scan, wherein the time-only authentication factor at a first timestamp associated with receiving the multi-factor authentication request to access the selected resource is a first one of the plurality of authentication factors, wherein the time-only authentication factor at a second timestamp associated with recieving the multi-factor authentication request to access the selected resource is a second one of the plurality of possible authentication factors, the first and second ones of the plurality of possible authentication factors being difference; and a spatial location-only authentication factor, wherein a spatial location associated with the user when the multi-factor authentication request is received determines which authentication factor of the plurality of possible authentication factors are used as the spatial location-only authentication factor, wherein the spatial location-only authentication factor at a first spatial location associated with the user is the first one of the plurality of possible authentication factors, wherein the spatial location-only authentication factor at a second spatial location associated with the user is the second one of the plurality of possible authentication factors;

authenticate the user based on the first authentication factor and the second authentication factor; and grant access to one or more resources according to one or more rules associated with the first authentication factor and second authentication factor, wherein the plurality of possible authentication factors comprise a valid SMS code, a valid fingerprint scan, a valid voiceprint, and a valid iris scan.

* * * * *